(12) United States Patent
Schneider et al.

(10) Patent No.: US 11,689,579 B2
(45) Date of Patent: Jun. 27, 2023

(54) METHOD AND APPARATUS FOR SECURITY MANAGEMENT IN 5G NETWORKS

(71) Applicant: Nokia Technologies Oy, Espoo (FI)

(72) Inventors: Peter Schneider, Holzkirchen (DE); Anja Jerichow, Grafing bei München (DE)

(73) Assignee: Nokia Technologies Oy, Espoo (FI)

( * ) Notice: Subject to any disclaimer, the term of this patent is extended or adjusted under 35 U.S.C. 154(b) by 366 days.

(21) Appl. No.: 17/264,768

(22) PCT Filed: Aug. 2, 2019

(86) PCT No.: PCT/EP2019/070850
§ 371 (c)(1),
(2) Date: Jan. 29, 2021

(87) PCT Pub. No.: WO2020/030537
PCT Pub. Date: Feb. 13, 2020

(65) Prior Publication Data
US 2021/0297457 A1 Sep. 23, 2021

(30) Foreign Application Priority Data
Aug. 8, 2018 (EP) .................................... 18187983

(51) Int. Cl.
*H04L 9/40* (2022.01)
*H04W 12/033* (2021.01)
(Continued)

(52) U.S. Cl.
CPC ........ *H04L 63/205* (2013.01); *H04L 63/0428* (2013.01); *H04L 63/0892* (2013.01);
(Continued)

(58) Field of Classification Search
CPC ... H04W 12/033; H04W 12/06; H04W 12/08; H04W 12/10; H04W 12/02; H04L 63/205; H04L 63/0428; H04L 63/0892
See application file for complete search history.

(56) References Cited

U.S. PATENT DOCUMENTS

2006/0023682 A1 2/2006 Tamura
2020/0029205 A1* 1/2020 Hu .......................... H04L 63/08

FOREIGN PATENT DOCUMENTS

| CN | 101414907 A | 4/2009 |
|---|---|---|
| CN | 102056168 A | 5/2011 |

(Continued)

OTHER PUBLICATIONS

Office action received for corresponding Chinese Patent Application No. 201980052137.2, dated Aug. 26, 2022, 7 pages of office action and no page of translation available.
(Continued)

*Primary Examiner* — Brian F Shaw
(74) *Attorney, Agent, or Firm* — Nokia Technologies Oy

(57) ABSTRACT

A session management function of a 5G system receives information that a secondary authentication is to be done for a given user equipment for authorising user equipment to use a data network; and responsively to the received information, communicates with the data network and receives from the data network an indication; and allows a 5G access to the user equipment so that the user equipment can communicate with the data network according to the indication either without cryptographic protection or with cryptographic protection depending on the indication.

20 Claims, 2 Drawing Sheets

--- receiving from the session management function of the 5G system an authentication request for authorising the user equipment to use a data network — 510 performing responsively to the authentication request at least: — 520 determining whether the 5G system should provide the user equipment with a communication channel with integrity protection and/or encryption — 530 based on the determination, sending to the 5G system an indication configured to cause the 5G system to provide user equipment with a communication channel either without cryptographic protection or with cryptographic protection — 540

(51) Int. Cl.
  *H04W 12/06*  (2021.01)
  *H04W 12/08*  (2021.01)
  *H04W 12/10*  (2021.01)

(52) U.S. Cl.
  CPC ......... *H04W 12/033* (2021.01); *H04W 12/06* (2013.01); *H04W 12/08* (2013.01); *H04W 12/10* (2013.01)

(56) References Cited

FOREIGN PATENT DOCUMENTS

| CN | 105791231 A | 7/2016 |
| CN | 107852601 A | 3/2018 |
| WO | 2018/137873 A1 | 8/2018 |

OTHER PUBLICATIONS

"3rd Generation Partnership Project; Technical Specification Group Services and System Aspects; IPv6 Migration Guidelines (Release 14)" 3GPP TR 23.975, V14.1.0, Sep. 2017, pp. 1-41.

Office Action received for corresponding Indian Patent Application No. 202147007612, dated Jan. 18, 2022, 6 pages.

Office Action received for corresponding European Patent Application No. 18187983.4, dated Apr. 11, 2022, 7 pages.

Office Action received for corresponding European Patent Application No. 18187983.4, dated Apr. 6, 2021, 7 pages.

"3rd Generation Partnership Project; Technical Specification Group Services and System Aspects; System Architecture for the 5G System; Stage 2 (Release 15)", 3GPP TS 23.501, V15.2.0, Jun. 2018, pp. 1-217.

"3rd Generation Partnership Project; Technical Specification Group Services and System Aspects; Security architecture and procedures for 5G system (Release 15)", 3GPP TS 33.501, V15.1.0, Jun. 2018, pp. 1-152.

"3rd Generation Partnership Project; Technical Specification Group Core Network and Terminals; 5G System; Session Management Services; Stage 3 (Release 15)", 3GPP TS 29.502, V15.0.0, Jun. 2018, pp. 1-116.

"3rd Generation Partnership Project; Technical Specification Group Core Network and Terminals; 5G System; Common Data Types for Service Based Interfaces; Stage 3 (Release 15)", 3GPP TS 29.571, V15.0.0, Jun. 2018, pp. 1-31.

"3rd Generation Partnership Project; Technical Specification Group Core Network and Terminals; 5G System Interworking between 5G Network and external Data Networks; Stage 3 (Release 15)", 3GPP TS 29.561, V15.0.0, Jun. 2018, pp. 1-44.

Extended European Search Report received for corresponding European Patent Application No. 18187983.4, dated Jan. 7, 2019, 6 pages.

International Search Report and Written Opinion received for corresponding Patent Cooperation Treaty Application No. PCT/EP2019/070850, dated Aug. 29, 2019, 11 pages.

\* cited by examiner

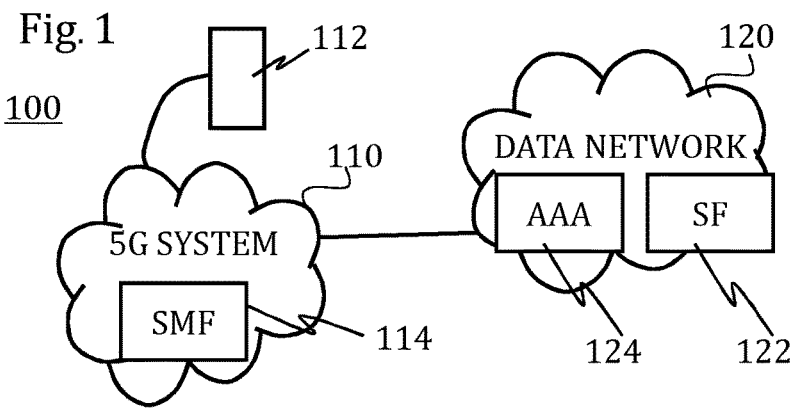

METHOD AND APPARATUS FOR SECURITY MANAGEMENT IN 5G NETWORKS

RELATED APPLICATION

This application claims priority to PCT Application No. PCT/EP2019/070850, filed on Aug. 2, 2019, which claims priority to EP Application No. 18187983.4, filed on Aug. 8, 2018, each of which is incorporated herein by reference in its entirety.

TECHNICAL FIELD

Various example embodiments relate to security management in 5G networks.

BACKGROUND

This section illustrates useful background information without admission of any technique described herein representative of the state of the art.

3GPP fifth generation (5G) system (5GS) aims at supporting applications with a wide range of requirements. In the Internet of Things (IoT) area, one requirement can be energy efficiency for the devices, e.g. cheap sensors with a battery that must last for many years. If such devices use a secondary authentication and apply application layer end-to-end security between the device and some entity in a data network (DN) that is reached via a 5GS, there is no significant security gain in doing 3GPP-specified Packet Data Convergence Protocol (PDCP) layer user plane traffic encryption and/or integrity protection (i.e. between the device and the PDCP entity that is part of a Next generation NodeB (gNB)) after the primary authentication to the 5GS. Therefore, the specification mandates support of such protection for both the network and the devices but comprises the option not to use it. The decision is done by the network (not by the device), based on a policy that must be available in the network at the time of the decision.

There is a concept for the 5GS of secondary authentication between the UE and an external data network, where the 5GS transports (in its control plane) Extensible Authentication Protocol (EAP) messages between the device and a DN in case the Unified Data Management (UDM) subscription information available to the Session Management Function (SMF) allows the access to the external DN only after successful secondary authentication. This allows arbitrary EAP-authentication methods to be carried out between device and DN. By those methods, authentication and key agreement may be done between device and DN. Only when the DN reports the success of the EAP run to the 5GS, the 5GS will establish user plane connectivity between the device and the DN.

During a Protocol Data Unit (PDU) session establishment, a Session Management Function sends to the gNB (the device is attached to) information on what user plane protection is to be applied over the air, according to a local policy at the SMF that can have the values "REQUIRED", "PREFERRED" or "NOT_NEEDED" for both confidentiality and integrity. It is not specified by 3GPP, what the local policy could be. An example envisioned by the inventors is that the network operator and a Data Network operator agree that all PDU sessions to this DN do not require protection. The operator then configures the SMF to send the policy "integrity and confidentiality is not needed" to the gNB for all such sessions. This would be a static policy for all PDU sessions to the DN.

It seems unrealistic that fine-grained policies per DN could be statically configured in the SMF, due to scalability reasons. Also, such policies will be rather static. That is, it is unrealistic that a DN operator could sufficiently frequently get a Mobile Network Operator (MNO) to configure a new or changed policy in the SMF.

It is specified that when an Authentication, Authorization, and Accounting (AAA) Server of the DN has successfully authenticated a subscriber, it sends to the SMF a Remote Authentication Dial In User Service (RADIUS) or Diameter message. The RADIUS or Diameter message contains, in addition to EAP Success message, so called authorization data that may contain a reference to a locally configured authorization data in the SMF. This data is an Attribute Value Pair (AVP) called 3GPP-Authorization-Reference and is an octet string. The use of the string is unspecified.

The traffic encryption and integrity protection procedures with related computational cost and battery consumption particularly challenge IoT devices and especially battery operated IoT devices, which may have designed battery life greater than one or two years.

SUMMARY

According to a first example aspect of the present invention, there is provided a method in a session management function of a 5G system, the method comprising:

receiving information that a secondary authentication is to be done for a given user equipment for authorising user equipment to use a data network;

responsively to the received information, communicating with the data network and receiving from the data network an indication; and allowing a 5G access to the user equipment so that the user equipment can communicate with the data network either without cryptographic protection or with cryptographic protection depending on the indication.

The authorising of the user equipment to use a data network may allow the user equipment to use a service in the data network.

The cryptographic protection may comprise Packet Data Convergence Protocol layer protection. The Packet Data Convergence Protocol layer protection may comprise integrity protection and/or encryption.

The method may comprise applying the cryptographic protection on all bearers provided by the 5G system for communication of the user equipment with the data network. The method may comprise applying the cryptographic protection on all bearers provided by the 5G system for a protocol data unit session used for communication of the user equipment with the data network.

The indication may be received in a RADIUS or Diameter message, such as a RADIUS access-accept message, a Diameter EAP-answer message or a Diameter re-auth request message. The RADIUS or Diameter message may comprise an Extensible Authentication Protocol success message. The RADIUS or Diameter message may comprise a first part comprising the Extensible Authentication Protocol success message. The RADIUS or Diameter message may comprise a second part comprising the indication. This second part may be a 3GPP-Authorization-Reference attribute value pair. The indication may concern a packet data convergence layer security policy desired by the data network. The indication may comprise a reference to a given one of a plurality of security policies which define settings of integrity protection and/or encryption. The security policy may have a value selected from policy values "REQUIRED", "PREFERRED" or "NOT NEEDED", one for integrity protection and one for encryption. The value "NOT NEEDED" may be interpreted as not to be used.

Alternatively, the indication may comprise the settings of integrity protection and/or encryption. The settings may include definition whether any integrity protection should be established for a connection between the user equipment and the 5G system. The settings may include definition whether any encryption should be established for a connection between the user equipment and the 5G system. The settings may further specify how the integrity protection and/or encryption should be implemented, such as which cipher suite should be used.

The indication may comprise a user plane protection indication configured to indicate that no integrity protection and/or encryption is needed for communication between the user equipment and the 5G system.

The indication may comprise two flags, one for encryption and the other for integrity protection. The flags may indicate whether or not to apply the integrity protection and encryption. The indication may be binding on the 5G system subject to national legal requirements, such as on usage of encryption per regulation.

The 5G system may further provide security policy information regarding the security policies to the data network or to a repository available to the data network for enabling the data network to select a security policy. The 5G system may further provide the security policy information regarding the security policies to the data network or to a repository available to the data network by an off-line communication, e.g. using one or more records stored on a memory medium. The security policies may be associated by respective identifiers or values to enable referencing to a desired security policy by the data network. The security policy information may comprise an indication of properties of the security policies. The security policy information may comprise a definition of the security policies.

The communicating with the data network responsively to the authentication request may be performed between the session management function and an Authentication, Authorization, and Accounting server of the data network.

The authentication request may be received before completion of a network attach process that provides the user equipment with communication connections through the 5G system. The authentication request may be received after completion of a network attach while the user equipment has ongoing communication connections through the 5G system.

The 5G system may comprise a cellular radio network.

The data network may be external to the 5G system.

According to a second example aspect there is provided a session management function of a 5G system comprising:

an input for receiving information that a secondary authentication is to be done for a given user equipment for authorising the user equipment to use a data network;

a processing block configured to perform responsively to the received information at least:

communicating with the data network and receiving from the data network an indication; and allowing a 5G access to the user equipment so that the user equipment can communicate with the data network either without cryptographic protection or with cryptographic protection depending on the indication.

The input may comprise a data input circuitry. The input may comprise computer program code.

The processing block may comprise computer program code. The processing block may comprise a processor.

The cryptographic protection may comprise Packet Data Convergence Protocol layer protection. The Packet Data Convergence Protocol layer protection may comprise integrity protection and/or encryption.

The session management function may be a service implemented by at least one server computer or computing cloud.

According to a third example aspect there is provided an authentication, accounting and authorizing function for a data network that is accessible to user equipment via a 5G system and configured to perform a secondary authentication of the user equipment with a session management function of the 5G system, the authentication, accounting and authorizing function comprising:

an input for receiving from the session management function of the 5G system a secondary authentication request for authorising the user equipment to use the data network;

a processing block configured to perform responsively to the secondary authentication request at least:

determining whether the 5G system should provide the user equipment with a communication channel with integrity protection and/or encryption; and based on the determination, sending to the 5G system an indication configured to cause the 5G system to provide the user equipment with a communication channel either without cryptographic protection or with cryptographic protection.

The authentication, accounting and authorizing function may be a service implemented by at least one server computer or computing cloud.

The input may comprise a data input circuitry. The input may comprise computer program code.

The processing block may comprise computer program code. The processing block may comprise a processor.

The cryptographic protection may comprise Packet Data Convergence Protocol layer protection. The Packet Data Convergence Protocol layer protection may comprise integrity protection and/or encryption.

According to a fourth example aspect there is provided a method in an authentication, accounting and authorizing function for a data network that is accessible to user equipment via a 5G system and configured to perform authenticating and authorising the user equipment with a session management function of the 5G system, the method comprising:

receiving from the session management function of the 5G system a secondary authentication request for authenticating and authorising the user equipment to the data network;

performing responsively to the secondary authentication request at least:

determining whether the 5G system should provide the user equipment with a communication channel with integrity protection and/or encryption; and based on the determination, sending to the 5G system an indication configured to cause the 5G system to provide the user equipment with a communication channel either without cryptographic protection or with cryptographic protection.

According to a fifth example aspect there is provided a computer program comprising computer program code configured to cause a computer, when executing the program code, to perform the method of the first or fourth example aspect.

According to a sixth example aspect there is provided a computer program product comprising the computer program of the fifth example aspect. The computer program product may comprise a memory medium configured to store the computer program of the fifth example aspect. The memory medium may be a non-transitory memory medium.

According to a seventh example aspect there is provided a system comprising the session management function of the 5G system and the authentication, accounting and authorizing function of the data network.

According to an eighth example aspect there is provided a system comprising the 5G system and the data network.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which:

FIG. 1 shows an architectural drawing of a system of an example embodiment;

FIG. 2 shows a flow chart of a process of an example embodiment in a session management function of a 5G system;

FIG. 5 shows a flow chart of a process of an example embodiment in the authentication, accounting and authorizing function.

DETAILED DESCRIPTION OF THE DRAWINGS

Figure 3:
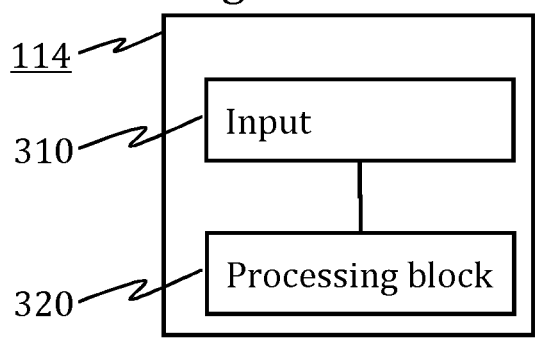
FIG. 3 shows a block diagram of a session management function of a 5G system according to an example embodiment, suited to implement the process of FIG. 2.

An example embodiment of the present invention and its potential advantages are understood by referring to FIGS. 1 through 6 of the drawings. In this document, like reference signs denote like parts or steps.

FIG. 1 shows an architectural drawing of a system 100 of an example embodiment. The system 100 comprises a 5G system 110 for providing radio communications to a plurality of user equipment 112. The system 100 further comprises a data network 120 that has, for example, service functions 122 (such as web services implemented, e.g., with web service servers or cloud computing services). The user equipment can, after a successful session setup, communicate through the 5G system 110 with the data network 120, e.g. with the service functions 122 therein. For authenticating and authorizing the communication of the user equipment 112 with the data network 120, the data network comprises an authentication, accounting and authorizing function 124. The 5G system 110 further comprises a session management function 114 for controlling the session setup in the 5G system 110.

The 5G system 110 is, for example, a 3GPP 5G system capable of providing radio communication services for Internet of Things devices that are devices capable of automatically measuring and relaying over Internet communications to each other measurement information without manual action. In the system 100, the UE 112 can be, for example, a smart phone. Alternatively, the UE 112 can be an apparatus intended to communicate solely of its own motion based on its measured information or detected event. For example, the apparatus can be a vending machine.

FIG. 2 shows a flow chart of a process of an example embodiment in a session management function of a 5G system. The process comprises:

210. receiving information that a secondary authentication is to be done for given user equipment 112 for authorising user equipment 112 to use a data network 120 (the use of the data network 120 comprises in an example embodiment using any of the service functions 122 of the data network 120);

220. responsively to the received information, communicating with the data network 120 and receiving from the data network 120 an indication; and 230. allowing a 5G access to the user equipment 112 so that the user equipment 112 can communicate with the data network 120 either without cryptographic protection or with cryptographic protection depending on the indication.

In an example embodiment, the cryptographic protection comprises Packet Data Convergence Protocol layer protection. The Packet Data Convergence Protocol layer protection may comprise integrity protection and/or encryption.

In an example embodiment, the cryptographic protection is applied to all bearers provided by the 5G system for communication of the user equipment with the data network, e.g., within a protocol data unit session used for communication of the user equipment with the data network. For example, some video transfer sessions may use a plurality of bearers and if no integrity protection and/or no encryption is needed, the same policy may be applied to all the bearers allocated by the 5G system for this session.

In an example embodiment, the indication is received in a RADIUS or Diameter message. In an example embodiment, the RADIUS or Diameter message is as a RADIUS access-accept message, a Diameter EAP-answer message or Diameter re-auth request message. In an example embodiment, the RADIUS or Diameter message comprises an Extensible Authentication Protocol success message. In an example embodiment, the RADIUS or Diameter message comprises a first part comprising the Extensible Authentication Protocol success message. The RADIUS or Diameter message may comprise a second part comprising the indication. The second part may be a 3GPP-Authorization-Reference attribute value pair. The indication may concern a packet data convergence layer security policy desired by the data network. The indication may comprise a reference to a given one of a plurality of security policies which define settings of integrity protection and/or encryption. In an example embodiment, the security policy has a value pair selected from policy values "REQUIRED", "PREFERRED" or "NOT NEEDED", one for integrity protection and one for encryption. In an example embodiment, the value "NOT NEEDED" is interpreted as not to be used.

In an example embodiment, the indication comprises a reference to a given one of a plurality of security policies which define settings of integrity protection and/or encryption. In an alternative example embodiment, the indication comprises the settings of integrity protection and/or encryption. In an example embodiment, the settings include definition whether any integrity protection should be established for a connection between the user equipment and the 5G system. In an example embodiment, the settings include definition whether any encryption should be established for a connection between the user equipment 112 and the 5G system 110. In an example embodiment, the settings further specify how the integrity protection and/or encryption should be implemented, such as which cipher suite should be used.

In an example embodiment, the indication comprises a user plane protection indication configured to indicate that no integrity protection and/or encryption is needed for communication between the user equipment 112 and the 5G system 110.

In an example embodiment, the indication comprises two flags, one for encryption and the other for integrity protection. In an example embodiment, the flags indicate whether or not to apply the integrity protection and encryption. In an example embodiment, the indication is binding on the 5G system 110 subject to national legal requirements, such as on usage of encryption per regulation.

In an example embodiment, the 5G system 110 further provides (e.g., by online or offline communication, either directly or indirectly) security policy information regarding the security policies to the data network or to a repository available to the data network for enabling the data network to select a security policy. For example, the security policy information regarding the security policies can be provided to the data network or to a repository available to the data network by an off-line communication using a transportable memory medium, such as a USB memory stick, CD, DVD or Blu-ray disk, or a portable hard disk. In an example embodiment, the security policies are associated by respective identifiers or values to enable referencing to a desired security policy by the data network. In an example embodiment, the security policy information comprises an indication of properties of the security policies. In an example embodiment, the security policy information comprises a definition of the security policies.

In an example embodiment, the communicating with the data network 120 responsively to the authentication request is performed between the session management function 114 and an Authentication, Authorization, and Accounting function 124 of the data network.

In an example embodiment, the authentication request is received before completion of a network attach process that provides the user equipment 112 with communication connections through the 5G system 110.

In an example embodiment, the 5G system 110 comprises a cellular radio network.

In an example embodiment, the data network 120 is external to the 5G system.

In an example embodiment, the cryptographic protection comprises Packet Data Convergence Protocol layer protection. In an example embodiment, the Packet Data Convergence Protocol layer protection comprises integrity protection and/or encryption.

In an example embodiment, the session management function 114 is a service implemented by at least one server computer or computing cloud.

FIG. 3 shows a block diagram of the session management function 114 of a 5G system according to an example embodiment, suited to implement the process of FIG. 2, comprising:

an input 310 for receiving information that a secondary authentication is to be done for a given user equipment 112 for authorising user equipment 112 to use the data network 120 (which data network 120 may be external to the 5G system 110 or implemented by the 5G system 110);

a processing block 320 configured to perform responsively to the received information at least:

communicating with the data network 120 and receiving from the data network 120 an indication; and allowing a 5G access to the user equipment 112 so that the user equipment 112 can communicate with the data network 120 either without cryptographic protection or with cryptographic protection depending on the indication.

In an example embodiment, the input 310 comprises a data input circuitry. In an example embodiment, the input comprises computer program code.

In an example embodiment, the processing block 320 comprises computer program code. In an example embodiment, the processing block comprises a processor.

Figure 4:
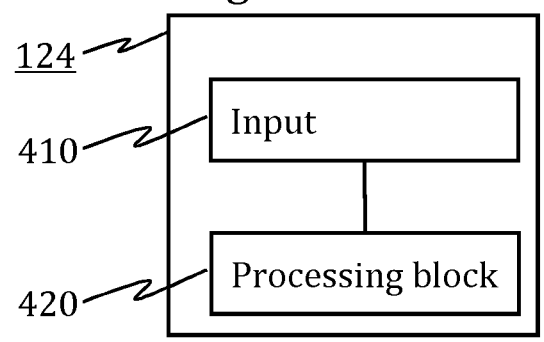
FIG. 4 shows a block diagram of an authentication, accounting and authorizing function according to an example embodiment for a data network.

FIG. 4 shows a block diagram of an authentication, accounting and authorizing function 124 according to an example embodiment for the data network 120. The authentication, accounting and authorizing function 124 for the data network 120 is accessible to user equipment 112 in a 5G system 110 and configured to perform a secondary authentication of the user equipment 112 with the session management function 114 of the 5G system 110. The authentication, accounting and authorizing function 124 comprises:

an input 410 for receiving from the session management function of the 5G system a secondary authentication request for authorising the user equipment to the data network; and a processing block 420 configured to perform responsively to the secondary authentication request at least:

determining whether the 5G system should provide the user equipment 112 with a communication channel with integrity protection and/or encryption; and based on the determination (whether the 5G system should provide the user equipment 112 with a communication channel with integrity protection and/or encryption), sending to the 5G system 110 an indication configured to cause the 5G system 110 to provide the user equipment 112 with a communication channel either without cryptographic protection or with cryptographic protection.

In an example embodiment, the authentication, accounting and authorizing function 124 is a service implemented by at least one server computer or computing cloud.

In an example embodiment, the input 410 comprises a data input circuitry. The input may comprise computer program code.

In an example embodiment, the processing block 420 comprises computer program code. In an example embodiment, the processing block 420 comprises a processor.

In an example embodiment, the cryptographic protection comprises Packet Data Convergence Protocol layer protection. In an example embodiment, the Packet Data Convergence Protocol layer protection comprises integrity protection and/or encryption.

FIG. 5 shows a flow chart of a process of an example embodiment in the authentication, accounting and authorizing function 124 for the data network 120 that is accessible to the user equipment 112 in the 5G system and configured to perform a secondary authentication of the user equipment 112 with the session management function 114 of the 5G system, the method comprising:

510. receiving from the session management function 114 of the 5G system 110 an authentication request for authorising the user equipment 112 to use the data network 120;

520. performing responsively to the authentication request at least:

530. determining whether the 5G system 110 should provide the user equipment 112 with a communication channel with integrity protection and/or encryption; and 540. based on the determination sending to the 5G system 110 an indication configured to cause the 5G system 110 to provide the user equipment 112 with a communication channel either without cryptographic protection or with cryptographic protection.

Figure 6:
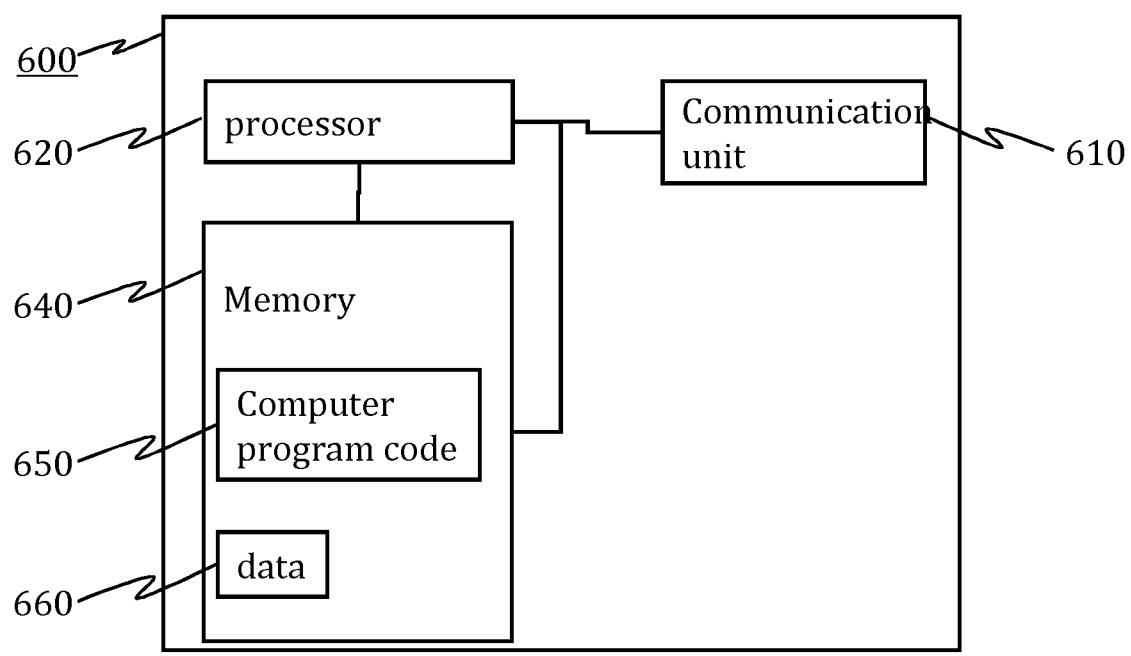
FIG. 6 shows a block diagram of an apparatus suited to operate as a session management function of a 5G system according to an example embodiment or as an authentication, accounting and authorizing function according to an example embodiment.

FIG. 6 shows a block diagram of an apparatus 600 suited to operate as a session management function of a 5G system according to an example embodiment or as an authentication, accounting and authorizing function according to an example embodiment. The apparatus 600 comprises a memory 640 including a persistent computer program code 650 and data 660 such as information about security policies and credentials. The apparatus 600 further comprises a processor 620 for controlling the operation of the apparatus 600 using the computer program code 640, a communication unit 610 for communicating with other elements. The communication unit 610 comprises, for example, a local area network (LAN) port; or a data bus. The processor 620 comprises, for example, any one or more of: a master control unit (MCU); a microprocessor; a digital signal processor (DSP); an application specific integrated circuit (ASIC); a field programmable gate array; and a microcontroller.

As used in this application, the term "circuitry" may refer to one or more or all of the following:
(a) hardware-only circuit implementations (such as implementations in only analogue and/or digital circuitry) and;
(b) combinations of hardware circuits and software, such as (as applicable):
  (i) a combination of analogue and/or digital hardware circuit(s) with software/firmware; and
  (ii) any portions of hardware processor(s) with software (including digital signal processor(s)), software, and memory(ies) that work together to cause an apparatus, such as a mobile phone or server, to perform various functions); and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Without in any way limiting the scope, interpretation, or application of the claims appearing below, a technical effect of one or more of the example embodiments disclosed herein is that a need may be avoided for management level interaction between the data network and the 5G system for setting up a (static) policy. Another technical effect of one or more of the example embodiments disclosed herein is that instead of a static policy, full flexibility may be provided in choosing the security policy on a per session basis. Yet another technical effect of one or more of the example embodiments disclosed herein is that same device or user equipment may connect to the same data network—or in other words: establish a session to the same data network—multiple times (in a row), and sometimes receives packet data convergence protocol layer protection and sometimes not, depending on the needs of each of the different sessions.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 6. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

The invention claimed is:

1. An apparatus comprising:
at least one processing core,
at least one memory including computer program code,
the at least one memory and the computer program code being configured to, with the at least one processing core, cause the apparatus at least to:
receive information that a secondary authentication is to be done for a user equipment for authorising the user equipment to use a data network;
responsively to the received information, communicate with the data network and receive from the data network an indication; and
allow a 5G access to the user equipment so that the user equipment can communicate with the data network either without cryptographic protection or with cryptographic protection depending on the indication.

2. The apparatus of claim 1, wherein the indication is received in a RADIUS or Diameter message that comprises a first part comprising an Extensible Authentication Protocol success message and a second part comprising the indication.

3. The apparatus of claim 1, wherein the indication comprises a reference to one of a plurality of security policies which define settings of integrity protection and/or encryption.

4. The apparatus of claim 1, wherein the indication comprises a user plane protection indication configured to indicate that no integrity protection and/or encryption is needed for communication between the user equipment and the 5G system.

5. The apparatus of claim 1, wherein the indication comprises two flags, one for encryption and the other for integrity protection, for individually indicating whether or not to apply the integrity protection and encryption.

6. The apparatus of claim 1, is further configured to cause to communicate with an Authentication, Authorization, and Accounting server of the data network.

7. The apparatus of claim 1, wherein the cryptographic protection comprises Packet Data Convergence Protocol layer protection.

8. A method in a session management function of a 5G system, comprising:
receiving information that a secondary authentication is to be done for a user equipment for authorising the user equipment to use a data network;
responsively to the received information, communicating with the data network and receiving from the data network an indication; and
allowing a 5G access to the user equipment so that the user equipment can communicate with the data network either without cryptographic protection or with cryptographic protection depending on the indication.

9. The method of claim 8, wherein the indication is received in a RADIUS or Diameter message that comprises a first part comprising an Extensible Authentication Protocol success message and a second part comprising the indication.

10. The method of claim 8, wherein the indication comprises a reference to one of a plurality of security policies which define settings of integrity protection and/or encryption.

11. The method of claim 8, wherein the indication comprises a user plane protection indication configured to indicate that no integrity protection and/or encryption is needed for communication between the user equipment and the 5G system.

12. The method of claim 8, wherein the indication comprises two flags, one for encryption and the other for integrity protection, for individually indicating whether or not to apply the integrity protection and encryption.

13. The method of claim 8, wherein communicating with the date network further comprising communicating with an Authentication, Authorization, and Accounting server of the data network.

14. The method of claim 8, wherein the cryptographic protection comprises Packet Data Convergence Protocol layer protection.

15. An apparatus comprising:
at least one processing core,
at least one memory including computer program code, the at least one memory and the computer program code being configured to, with the at least one processing core, cause the apparatus at least to:
receive from a session management function of a 5G system a secondary authentication request for authorising an user equipment to use the data network;
responsively to the secondary authentication request, determine whether the 5G system should provide the user equipment with a communication channel with integrity protection and/or encryption; and
based on the determination, send to the 5G system an indication configured to cause the 5G system to provide the user equipment with a communication channel either without cryptographic protection or with cryptographic protection.

16. The apparatus of claim 15, wherein the indication comprises a reference to a given one of a plurality of security policies which define settings of integrity protection and/or encryption.

17. The apparatus of claim 15, wherein the indication comprises a user plane protection indication configured to indicate that no integrity protection and/or encryption is needed for communication between the user equipment and the 5G system.

18. The apparatus of claim 15, wherein the indication comprises two flags, one for encryption and the other for integrity protection, for individually indicating whether or not to apply the integrity protection and encryption.

19. The apparatus of claim 15, wherein the communicating with the data network responsively to the authentication request is performed between the session management function and an Authentication, Authorization, and Accounting server of the data network.

20. The apparatus of claim 15, wherein the cryptographic protection comprises Packet Data Convergence Protocol layer protection.

* * * * *